US010187506B2

(12) United States Patent
Kim et al.

(10) Patent No.: US 10,187,506 B2
(45) Date of Patent: Jan. 22, 2019

(54) DUAL SUBSCRIBER IDENTITY MODULE (SIM) CARD ADAPTER FOR ELECTRONIC DEVICE THAT ALLOWS FOR SELECTION BETWEEN SIM CARD(S) VIA GUI DISPLAY

(71) Applicant: Samsung Electronics Co., Ltd., Suwon-si, Gyeonggi-do (KR)

(72) Inventors: Sangwook Kim, Seongnam-si (KR); Sohmann Kim, Yongin-si (KR); Youngkou Han, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 84 days.

(21) Appl. No.: 14/532,506

(22) Filed: Nov. 4, 2014

(65) Prior Publication Data
US 2015/0169425 A1    Jun. 18, 2015

(30) Foreign Application Priority Data

Dec. 18, 2013  (KR) ......................... 10-2013-0158037

(51) Int. Cl.
| H04M 1/02 | (2006.01) |
| H04M 1/725 | (2006.01) |
| H04W 8/18 | (2009.01) |
| G06F 3/0481 | (2013.01) |
| H04W 88/06 | (2009.01) |

(52) U.S. Cl.
CPC ....... *H04M 1/72519* (2013.01); *H04W 8/183* (2013.01); *G06F 3/04817* (2013.01); *H04M 1/72583* (2013.01); *H04M 2250/14* (2013.01); *H04M 2250/66* (2013.01); *H04W 88/06* (2013.01)

(58) Field of Classification Search
CPC .......... H04M 1/72519; H04M 1/72583; G06F 3/04817
USPC ............................... 710/14–19; 455/434, 558
See application file for complete search history.

(56) References Cited

U.S. PATENT DOCUMENTS

| 8,433,318 B2 * | 4/2013 | Krishnamoorthy ... H04W 48/16 455/434 |
| 8,447,358 B2 * | 5/2013 | Lee ................... H04M 1/72583 455/411 |
| 8,526,946 B2 * | 9/2013 | Pattaswamy .......... H04W 8/183 455/435.1 |

(Continued)

FOREIGN PATENT DOCUMENTS

| KR | 10-2009-0032678 A | 4/2009 |
| WO | 2013/093559 A1 | 6/2013 |
| WO | 2013/115533 A1 | 8/2013 |

OTHER PUBLICATIONS

European Search Report dated Jun. 30, 2017, issued in the European Application No. 14871054.4.

*Primary Examiner* — Tammara R Peyton
(74) *Attorney, Agent, or Firm* — Jefferson IP Law, LLP (57) ABSTRACT

A method of operating an electronic device is provided. The method includes recognizing a number of connection components provided in the electronic device, storing count data corresponding to the recognized number of the connection components in a memory of the electronic device, acquiring the count data from the memory, and displaying application information corresponding to the acquired count data through a display connected to the electronic device.

10 Claims, 9 Drawing Sheets

(56) References Cited

U.S. PATENT DOCUMENTS

| | | | |
|---|---|---|---|
| 8,621,397 B2 * | 12/2013 | Chae | H04M 1/72522 455/435.2 |
| 8,750,931 B2 * | 6/2014 | Park | H04W 8/183 455/552.1 |
| 8,874,168 B2 * | 10/2014 | Luo | H04W 48/18 455/435.2 |
| 8,893,055 B2 * | 11/2014 | Chae | G06F 3/04817 715/811 |
| 8,908,579 B2 * | 12/2014 | Liu | H04W 76/048 370/310 |
| 8,983,441 B2 * | 3/2015 | Baek | H04W 4/16 455/417 |
| 9,237,593 B2 * | 1/2016 | Kirveskoski | H04W 76/025 |
| 9,374,697 B2 * | 6/2016 | Shih | H04W 4/90 |
| 9,615,232 B2 * | 4/2017 | Bendixen | H04W 76/14 |
| 2006/0234693 A1 * | 10/2006 | Isidore | H04M 1/72519 455/422.1 |
| 2009/0029736 A1 * | 1/2009 | Kim | H04M 1/72522 455/558 |
| 2009/0088211 A1 | 4/2009 | Kim | |
| 2010/0060595 A1 * | 3/2010 | Lee | H04M 1/2745 345/173 |
| 2011/0235587 A1 | 9/2011 | Zhang et al. | |
| 2012/0093075 A1 | 4/2012 | Derkach et al. | |
| 2012/0264425 A1 | 10/2012 | Krishnamoorthy et al. | |
| 2012/0315896 A1 | 12/2012 | Syrjarinne et al. | |
| 2013/0203438 A1 | 8/2013 | Shin | |
| 2013/0203461 A1 | 8/2013 | Li | |
| 2013/0260761 A1 | 10/2013 | Walke et al. | |
| 2014/0274210 A1 * | 9/2014 | Tsai | H04B 1/3816 455/558 |

\* cited by examiner

DUAL SUBSCRIBER IDENTITY MODULE (SIM) CARD ADAPTER FOR ELECTRONIC DEVICE THAT ALLOWS FOR SELECTION BETWEEN SIM CARD(S) VIA GUI DISPLAY

CROSS-REFERENCE TO RELATED APPLICATION(S)

This application claims the benefit under 35 U.S.C. § 119(a) of a Korean patent application filed on Dec. 18, 2013 in the Korean Intellectual Property Office and assigned Serial number 10-2013-0158037, the entire disclosure of which is hereby incorporated by reference.

TECHNICAL FIELD

The present disclosure relates to an electronic device having at least one connection component and a method of operating the same.

BACKGROUND

In general, an electronic device has various connection components. For example, a smartphone may have a plurality of Subscriber Identity Module (SIM) card slots. SIM cards are inserted into SIM card slots respectively. Accordingly, a smartphone may provide various services to a user. As an example, a user may use several phone numbers through one smartphone.

The above information is presented as background information only to assist with an understanding of the present disclosure. No determination has been made, and no assertion is made, as to whether any of the above might be applicable as prior art with regard to the present disclosure.

SUMMARY

In general, information associated with slots of an electronic device (e.g., information on the number of slots) is stored in a Read Only Memory (ROM) of the corresponding electronic device when the electronic device is manufactured. Thus, separate software may be needed depending on the number of slots. For example, an electronic device may be provided with one to three Subscriber Identity Module (SIM) card slots. Then, the manufacturer of the electronic device may have difficulty in software management because it is in a position in which it must separately develop and maintain software to be applied to different models such as Single SIM, Dual SIM, and Triple SIM respectively.

Aspects of the present disclosure are to address at least the above-mentioned problems and/or disadvantages and to provide at least the advantages described below. Accordingly, an aspect of the present disclosure is to provide an electronic device and an operating method thereof, which can determine a number of connection components and provide application information corresponding to the determined number of connection components to a user. In various embodiments of the present disclosure, the electronic device may include various connection components, for example, at least one SIM card slot. Further, the electronic device may include a connection terminal for connecting an external Near Field Communication (NFC) module, including an NFC antenna, to a processor provided in the electronic device. Further, the electronic device may include, as the connection component, a memory card slot, e.g., Secure Digital (SD) card slot, for connecting an external memory, e.g., an SD card, to a processor provided in the electronic device.

In accordance with an aspect of the present disclosure, a method of operating an electronic device is provided. The method includes recognizing a number of connection components provided in the electronic device, storing count data corresponding to the recognized number of the connection components in a memory of the electronic device, acquiring the count data from the memory, and displaying application information corresponding to the acquired count data through a display connected to the electronic device.

In accordance with another aspect of the present disclosure, an electronic device is provided. The electronic device includes at least one connection component, a memory configured to store count data, a display configured to display application information, an application control module configured to recognize a number of the at least one connection component, to store the count data corresponding to the recognized number of the at least one connection component in the memory, to acquire the count data from the memory, and to display the application information corresponding to the acquired count data through the display, and at least one processor configured to execute the application control module.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

As used in the present disclosure, the expression "include" or "may include" refers to the existence of a corresponding function, operation, or constituent element, and does not limit one or more additional functions, operations, or constituent elements. Further, as used in the present disclosure, the term such as "include" or "have" may be construed to denote a certain characteristic, number, step, operation, constituent element, component or a combination thereof, but may not be construed to exclude the existence of or a possibility of addition of one or more other characteristics, numbers, steps, operations, constituent elements, components or combinations thereof.

As used in the present disclosure, the expression "or" includes any or all combinations of words enumerated together. For example, the expression "A or B" may include A, may include B, or may include both A and B.

While expressions including ordinal numbers, such as "first" and "second", as used in the present disclosure may modify various constituent elements, such constituent elements are not limited by the above expressions. For example, the above expressions do not limit the sequence and/or importance of the corresponding constituent elements. The above expressions may be used merely for the purpose of distinguishing a constituent element from other constituent elements. For example, a first user device and a second user device indicate different user devices although both are user devices. For example, a first constituent element may be termed a second constituent element, and likewise a second constituent element may also be termed a first constituent element without departing from the scope of the present disclosure.

When a component is referred to as being "connected" or "accessed" to any other component, it should be understood that the component may be directly connected or accessed to the other component, but another new component may also be interposed between them. Contrarily, when a component is referred to as being "directly connected" or "directly accessed" to any other component, it should be understood that there is no new component between the component and the other component.

The terms as used in various embodiments of the present disclosure are merely for the purpose of describing particular various embodiments and are not intended to limit the present disclosure. Singular forms are intended to include plural forms unless the context clearly indicates otherwise.

Unless defined otherwise, all terms used herein, including technical terms and scientific terms, have the same meaning as commonly understood by a person of ordinary skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in the present disclosure.

An electronic device according to an embodiment of the present disclosure may be a device including a communication function. For example, the electronic device may include at least one of a smartphone, a tablet Personal Computer (PC), a mobile phone, a video phone, an electronic book (e-book) reader, a desktop PC, a laptop PC, a netbook computer, a Personal Digital Assistant (PDA), a Portable Multimedia Player (PMP), a Motion Picture Expert Group (MPEG) Audio Layer 3 (MP3) player, a mobile medical appliance, a camera, and a wearable device, e.g., a Head-Mounted-Device (HMD) such as electronic glasses, electronic clothes, an electronic bracelet, an electronic necklace, an electronic accessory, electronic tattoos, or a smart watch.

According to some various embodiments, the electronic device may be a smart home appliance with a communication function. The smart home appliance as the electronic device, for example, may include at least one of a television, a Digital Video Disk (DVD) player, an audio, a refrigerator, an air conditioner, a vacuum cleaner, an oven, a microwave oven, a washing machine, an air cleaner, a set-top box, a TV box, e.g., Samsung HomeSync™, Apple TV™, or Google TV™, a game console, an electronic dictionary, an electronic key, a camcorder, and an electronic photo frame.

According to various embodiments, the electronic device may include at least one of various medical devices, e.g., Magnetic Resonance Angiography (MRA), Magnetic Resonance Imaging (MRI), Computed Tomography (CT), and ultrasonic machines, navigation equipment, a Global Positioning System (GPS) receiver, an Event Data Recorder (EDR), a Flight Data Recorder (FDR), an automotive infotainment device, electronic equipment for ships, e.g., ship navigation equipment and a gyrocompass, avionics, security equipment, a vehicle head unit, an industrial or home robot, an Automatic Teller Machine (ATM) of a banking system, and a Point Of Sales (POS) in a shop.

According to various embodiments, the electronic device may include at least one of a part of furniture or a building/structure, an electronic board, an electronic signature receiving device, a projector, and various kinds of measuring instruments, e.g., a water meter, an electric meter, a gas meter, and a radio wave meter. The electronic device according to an embodiment of the present disclosure may be a combination of one or more of the aforementioned various devices. Further, the electronic device according to an embodiment the present disclosure may be a flexible device. Further, it will be apparent to those skilled in the art that the electronic device according to the present disclosure is not limited to the aforementioned devices.

Hereinafter, an electronic device according to various embodiments of the present disclosure will be discussed with reference to the accompanying drawings. The term "a user" as used in various embodiments may refer to any person who uses an electronic device or any other device, e.g., an artificial intelligence electronic device, using an electronic device.

Figure 1:
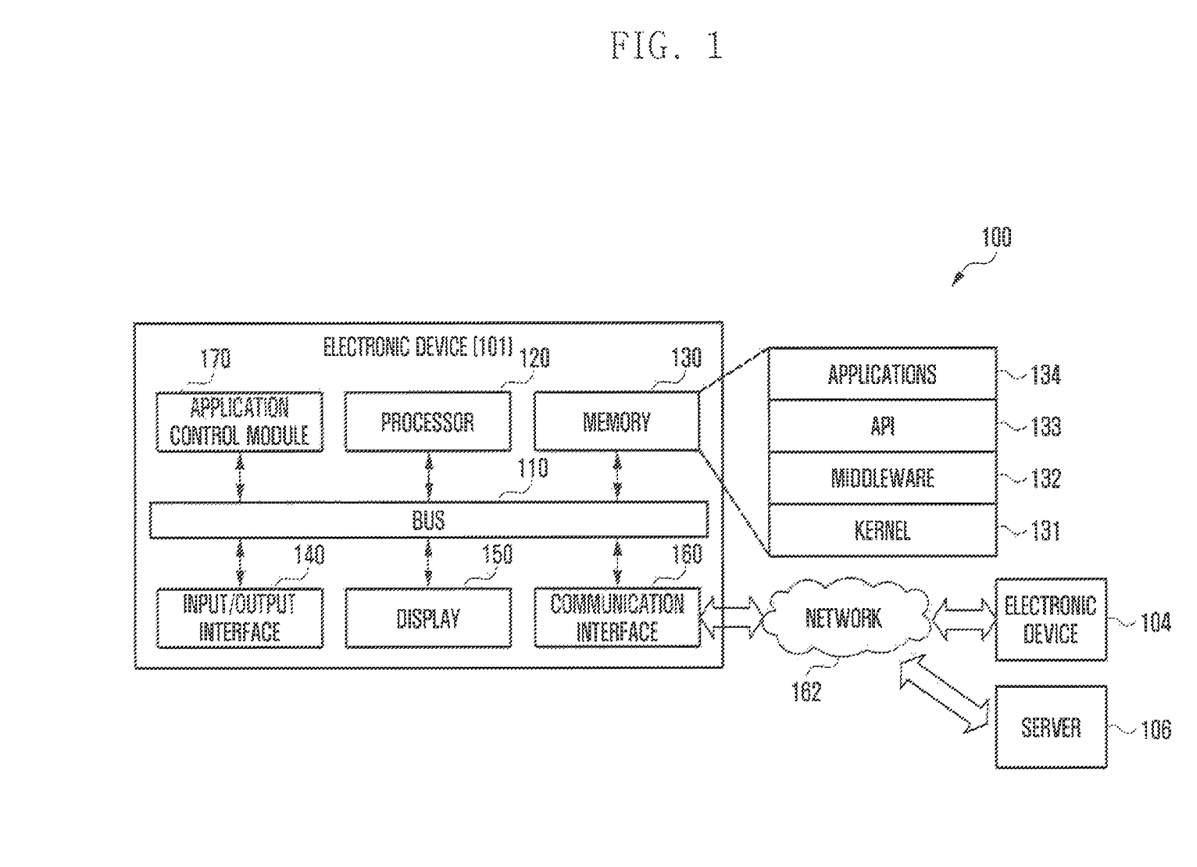
FIG. 1 is a block diagram illustrating a network environment including an electronic device according to an embodiment of the present disclosure.

FIG. 1 illustrates a network environment including an electronic device according to an embodiment of the present disclosure.

Referring to FIG. 1, a network environment 100 may include an electronic device 101, which may include a bus 110, a processor 120, a memory 130, an input/output interface 140, a display 150, a communication interface 160, and an application control module 170.

The bus 110 may be a circuit interconnecting the aforementioned components and transmitting communication, e.g., a control message, between the aforementioned components.

The processor 120, for example, may receive instructions from the aforementioned components, e.g., the memory 130, the input/output interface 140, the display 150, the communication interface 160, and the application control module 170, other than the processor 120 through the bus 110, decode the received instructions, and perform operations or data processing according to the decoded instructions.

The memory 130 may store instructions and/or data received from or generated by the processor 120 or other components, e.g., the input/output interface 140, the display 150, the communication interface 160, and the application control module 170. The memory 130 may include programming modules, for example, a kernel 131, middleware 132, an Application Programming interface (API) 133, and applications 134. Each of the programming modules as described above may be formed by software, firmware, hardware, or a combination of two or more thereof.

The kernel 131 may control or manage system resources, e.g., the bus 110, the processor 120, and the memory 130, used to execute operations or functions implemented in the remaining other programming modules, for example, the middleware 132, the API 133, and the applications 134. Further, the kernel 131 may provide an interface that allows the middleware 132, the API 133, or the applications 134 to access and control or manage individual components of the electronic device 101.

The middleware 132 may serve to mediate between the API 133 or the applications 134 and the kernel 131, that is, the middleware 132 may allow the API 133 or the application 134 to communicate and exchange data with the kernel 131. Further, the middleware 132 may perform control, e.g., scheduling or load balancing, for task requests received from the applications 134 by using, for example, a method of assigning a priority for use of the system resource, e.g., the bus 110, the processor 120, or the memory 130, of the electronic device 101 to at least one of the applications 134.

The API 133 is an interface for allowing the applications 134 to control functions provided by the kernel 131 and the middleware 132, and may include at least one interface or function, e.g., instruction, for, for example, file control, window control, image processing, or text control.

According to various embodiments, the applications 134 may include an Short Messaging Service/Multimedia Messaging Service (SMS/MMS) application, an e-mail application, a calendar application, an alarm application, a health care application, e.g., an application for measuring the amount of exercise or blood glucose, and an environmental information application, e.g., an application for providing atmospheric pressure information, humidity information, temperature information, and the like. Additionally or alternatively, the applications 134 may include an application associated with information exchange between the electronic device 101 and an external electronic device, e.g., an electronic device 104 or a server 106. The application associated with information exchange, for example, may include a notification relay application for transferring specific information to the external electronic device or a device management application for managing the external electronic device.

For example, the notification relay application may include a function of transferring notification information, generated in another application of the electronic device 101, e.g., the SMS/MMS application, the e-mail application, the health care application, or the environmental information application, to an external electronic device, e.g., the electronic device 104. Additionally or alternatively, the notification relay application, for example, may receive notification information from an external electronic device, e.g., the electronic device 104, and provide the received notification information to a user. The device management application, for example, may manage, e.g., install, remove, or update, a function for at least a part of an external electronic device, e.g., the electronic device 104, communicating with the electronic device 101, e.g., a function of turning on/off an external electronic device itself or some components thereof or adjusting the brightness or resolution of a display, an application running on the external electronic device, or a service provided in the external electronic device, e.g., a calling or messaging service.

According to various embodiments, the applications 134 may include an application specified according to the attribute, e.g., type, of an external electronic device, e.g., the electronic device 104. For example, when the external electronic device is an MP3 player, the applications 134 may include an application associated with music playback. Similarly, when the external electronic device is a mobile medical device, the applications 134 may include an application associated with health care. According to an embodiment of the present disclosure, the applications 134 may include at least one of an application assigned to the electronic device 101 and an application received from an external electronic device, e.g., the server 106 or the electronic device 104.

The input/output interface 140, for example, may transfer instructions or data, input from a user through an input/output device, e.g., a sensor, a keyboard, or a touch screen, to the processor 120, the memory 130, the communication interface 160, or the application control module 170, through the bus 110. For example, the input/output interface 140 may provide the processor 120 with data corresponding to a user's touch input through a touch screen. Further, the input/output interface 140 may, for example, receive instructions or data from the processor 120, the memory 130, the communication interface 160, or the application control module 170 through the bus 110 and output the received instructions or data through the input/output device, e.g., a speaker or a display. For example, the input/output interface 140 may output voice data processed by the processor 120 to a user through a speaker.

The display 150 may display various pieces of information, e.g., multimedia data or text data, to a user.

The communication interface 160 may establish communication between the electronic device 101 and an external electronic device, e.g., the electronic device 104 or the server 106. For example, the communication interface 160 may be connected to a network 162 through wireless or wired communication and thereby communicate with the external device. The wireless communication, for example, may include at least one of Wireless Fidelity (WiFi), Bluetooth (BT), Near Field Communication (NFC), a GPS, and cellular communication, e.g., LTE, LTE-A, CDMA, CDMA, UMTS, WiBro, or GSM. The wired communication, for example, may include at least one of a Universal Serial Bus (USB), a High Definition Multimedia Interface (HDMI), Recommended Standard 232 (RS-232), and a Plain Old Telephone Service (POTS).

According to an embodiment of the present disclosure, the network 162 may be a telecommunications network. The telecommunications network may include at least one of a computer network, the Internet, the Internet of things, and a telephone network. According to an embodiment, a protocol, e.g., a transport layer protocol, a data link layer protocol, or a physical layer protocol, for communication between the electronic device 101 and an external device may be supported by at least one of the applications 134, the application programming interface 133, the middleware 132, the kernel 131, and the communication interface 160.

The application control module 170 may process at least some pieces of information acquired from other components, e.g., the processor 120, the memory 130, the input/output interface 140, and the communication interface 160, and provide the processed information to a user in various ways. For example, the application control module 170 may recognize information on connection components provided in the electronic device 101, store the information on the connection components in the memory 130, and execute the applications 130, based on the stored information on the connection components. Further information of the application control module 170 will be provided below through a description of FIGS. 2 to 9.

Figure 2:
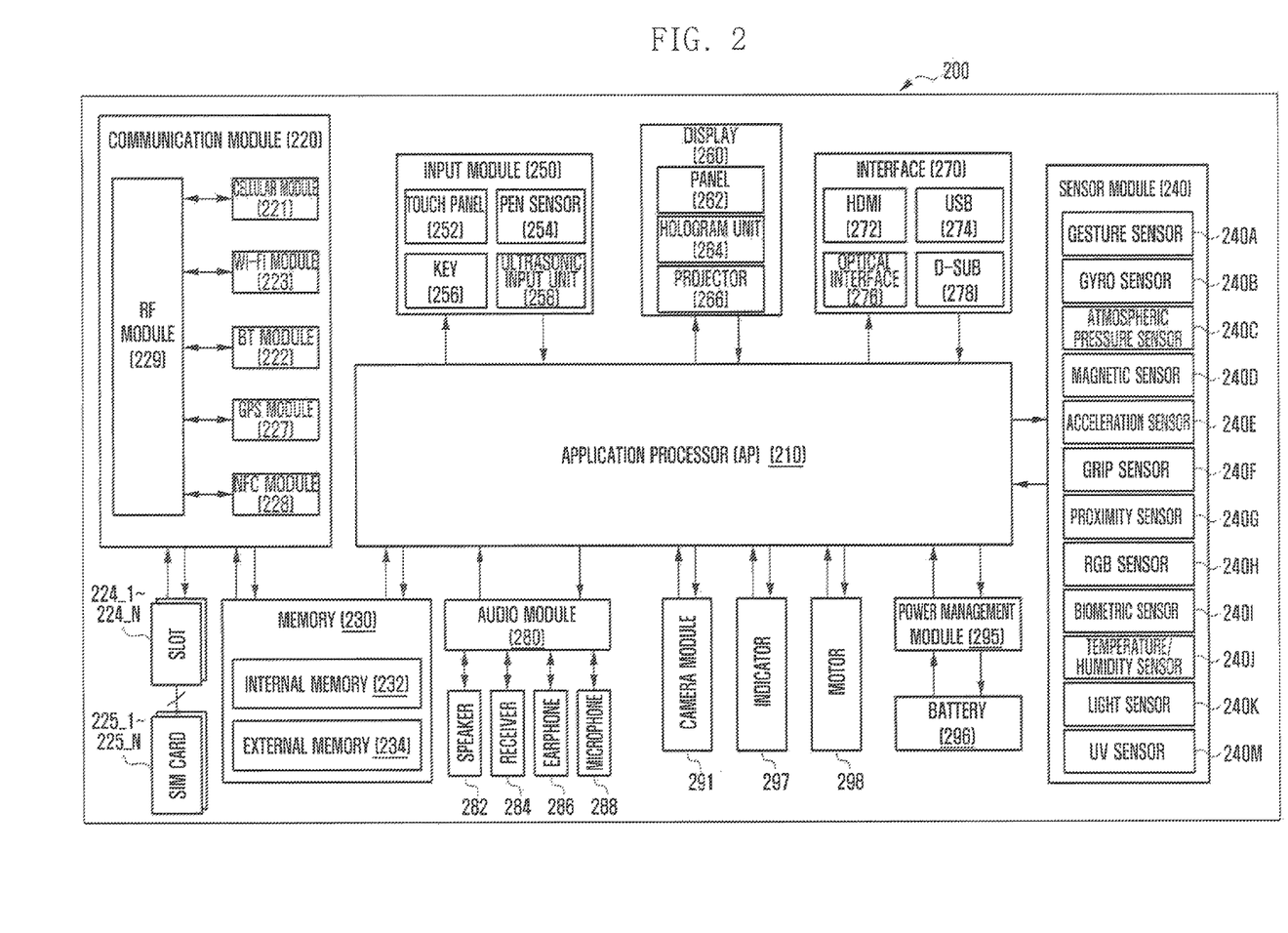
FIG. 2 is a block diagram of an electronic device according to an embodiment of the present disclosure.

FIG. 2 illustrates a block diagram of an electronic device according to an embodiment of the present disclosure.

An electronic device 200, for example, may constitute all or a part of the electronic device 101 shown in FIG. 1. Referring to FIG. 2, the electronic device 200 may include at least one Application Processor (AP) 210, which may also be referred to as a processor 210, a communication module 220, a plurality of Subscriber Identity Module (SIM) card slots 224_1~224_N, a memory 230, a sensor module 240, an input module 250, a display 260, an interface 270, an audio module 280, a camera module 291, a power management module 295, a battery 296, an indicator 297, and a motor 298.

The AP 210 may drive an operating system or an application program to control a plurality of hardware or software components connected to the AP 210, and may perform processing and operations of various data including multimedia data. The AP 210, for example, may be implemented as a System on Chip (SoC). According to an embodiment, the AP 210 may further include a Graphic Processing Unit (GPU) (not shown).

The communication module 220, e.g., the communication interface 160, may perform data transmission/reception in communication with other electronic devices, e.g., the electronic device 104 and the server 106, connected to the electronic device 200, e.g., the electronic device 101, through a network. According to an embodiment of the present disclosure, the communication module 220 may include a cellular module 221, a WiFi module 223, a BT module 222, a GPS module 227, an NFC module 228, and a Radio Frequency (RF) module 229.

The cellular module 221 may provide a voice call, a video call, an SMS service, an Internet service, and the like through a communication network, e.g., LTE, LTE-A, CDMA, WCDMA, UMTS, WiBro, or GSM. Also, the cellular module 221 may identify and authenticate an electronic device in a communication network by using, for example, a SIM, e.g., the SIM card. According to an embodiment of the present disclosure, the cellular module 221 may perform at least some of the functions that may be provided by the AP 210. For example, the cellular module 221 may perform at least a multimedia control function.

According to an embodiment of the present disclosure, the cellular module 221 may include a Communication Processor (CP) (not shown). Further, the cellular module 221, for example, may be implemented as a SoC. Although the cellular module 221, e.g., a CP, the memory 230, the power management module 295, and the like are shown as separate elements from the AP 210 in FIG. 2, the AP 210 may be implemented to include at least some, e.g., the cellular module 221 of the aforementioned elements according to an embodiment of the present disclosure.

According to an embodiment of the present disclosure, the AP 210 or the cellular module 221, e.g., a CP, may load a command or data received from at least one of a non-volatile memory and other elements connected thereto into a volatile memory and process the loaded command or data. Further, the AP 210 or the cellular module 221 may store data received from or generated by at least one of other elements in a non-volatile memory.

Each of the WiFi module 223, the BT module 222, the GPS module 227, and the NFC module 228, for example, may include a processor (not shown) for processing data transmitted or received through the corresponding module. Although the cellular module 221, the WiFi module 223, the BT module 222, the GPS module 227, and the NFC module 228 are shown as separate blocks in FIG. 2, at least some, e.g., two or more, of the cellular module 221, the WiFi module 223, the BT module 222, the GPS module 227, and the NFC module 228 may be included in one Integrated Circuit (IC) or one IC package according to an embodiment of the present disclosure. For example, at least some of processors corresponding to the cellular module 221, the WiFi module 223, the BT module 222, the GPS module 227, and the NFC module 228 respectively, e.g., a CP corresponding to the cellular module 221 and a WiFi processor corresponding to the WiFi module 223, may be implemented as one SoC.

The RF module 229 may perform data transmission/reception, for example, RF signal transmission/reception. Although not shown in the drawing, the RF module 229, for example, may include a transceiver, a Power Amp Module (PAM), a frequency filter, a Low Noise Amplifier (LNA), and the like. Also, the RF module 229 may further include a component for transmitting/receiving an electromagnetic wave over the air in wireless communication, such as a conductor or a conducting wire. Although FIG. 2 shows that the cellular module 221, the WiFi module 223, the BT module 222, the GPS module 227, and the NFC module 228 share one RF module 229, at least one of the cellular module 221, the WiFi module 223, the BT module 222, the GPS module 227, and the NFC module 228 may perform RF signal transmission/reception through a separate RF module according to an embodiment of the present disclosure.

A plurality of SIM cards 225_1 to 225_N may be a card including a SIM, and may be respectively inserted into the SIM card slots 224_1 to 224_N formed in a certain position of the electronic device 200. The plurality of SIM cards 225_1 to 225_N may include unique identification information, e.g., Integrated Circuit Card IDentifier (ICCID), or subscriber information, e.g., International Mobile Subscriber Identity (IMSI).

The memory 230, e.g., the memory 130, may include an internal memory 232 or an external memory 234. The internal memory 232, for example, may include at least one of a volatile memory, e.g., a dynamic Random Access Memory (DRAM), a static RAM (SRAM), or a synchronous dynamic RAM (SDRAM), and a non-volatile memory, e.g., a One-Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, or an NOR flash memory.

According to an embodiment of the present disclosure, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), or a memory stick. The external memory 234 may be functionally connected to the electronic device 200 through various interfaces. According to an embodiment of the present disclosure, the electronic device 200 may further include a storage device or storage medium, such as a hard drive.

The sensor module 240 may measure a physical quantity or detect an operation state of the electronic device 200 and convert the measured or detected information into an electronic signal. The sensor module 240, for example, may include at least one of a gesture sensor 240A, a gyro sensor 240B, an atmospheric pressure sensor 240C, a magnetic sensor 240D, an acceleration sensor 240E, a grip sensor 240F, a proximity sensor 240G, a Red, Green and Blue (RGB) sensor 240H, a biometric sensor 240I, a temperature/humidity sensor 240J, a light sensor 240K, and an Ultraviolet (UV) sensor 240M. Additionally or alternatively, the sensor module 240, for example, may include an E-nose sensor (not shown), an Electromyography (EMG) sensor (not shown), an Electroencephalogram (EEG) sensor (not shown), an Electrocardiogram (ECG) sensor (not shown), an Infrared (IR) sensor (not shown), an iris scanner (not shown), and/or a fingerprint sensor (not shown). The sensor module 240 may further include a control circuit for controlling one or more sensors included therein.

The input module 250 may include a touch panel 252, a pen sensor 254, a key 256, or an ultrasonic input unit 258. The touch panel 252 that recognizes a touch input, for example, may include at least one of a capacitive touch panel, a resistive touch panel, an infrared touch panel, and an acoustic wave touch panel. Also, the touch panel 252 may further include a control circuit. When the touch panel is a capacitive touch panel, it may recognize a physical contact or proximity. The touch panel 252 may also further include a tactile layer. In this case, the touch panel 252 may provide a tactile response to a user.

The pen sensor 254, for example, may be a digital pen and may be implemented using a means identical or similar to a means for receiving a touch input from a user or using a separate recognition sheet. The key 256, for example, may include a physical button, an optical key, or a keypad. The ultrasonic input unit 258 is a unit that can identify data by generating an ultrasonic signal through an input tool and detecting a sonic wave through a microphone, e.g., a microphone 288, in the electronic device 200, and is capable of wireless recognition. According to an embodiment, the electronic device 200 may also receive a user input from an external device, e.g., computer or server, connected thereto by using the communication module 220.

The display 260, e.g., the display 150, may include a panel 262, a hologram unit 264, or a projector 266. The panel 262, for example, may be a Liquid Crystal Display (LCD) or an Active Matrix-Organic Light Emitting Diode (AM-OLED). The panel 262, for example, may be implemented to be flexible, transparent, or wearable. The panel 262 may also be incorporated into one module together with the touch panel 252. The hologram unit 264 may show a stereoscopic image in the air by using light interference. The projector 266 may display an image by projecting light onto a screen. The screen, for example, may be located inside or outside of the electronic device 200. According to an embodiment of the present disclosure, the display 260 may further include a control circuit for controlling the panel 262, the hologram unit 264, or the projector 266.

The interface 270, for example, may include a high-definition multimedia interface (HDMI) 272, a USB 274, an optical interface 276, or a D-subminiature (D-sub) 278. The interface 270, for example, may be included in the communication interface 160 shown in FIG. 1. Additionally or alternatively, the interface 290, for example, may include a Mobile High-definition Link (MHL) interface, SD card/Multimedia Card (MMC) interface, or an Infrared Data Association (IrDA) interface.

The audio module 280 may provide bidirectional conversion between a sound and an electronic signal. At least some elements of the audio module 280, for example, may be included in the input/output interface 140 shown in FIG. 1. The audio module 280, for example, may process sound information input or output through a speaker 282, a receiver 284, earphones 286, or the microphone 288.

The camera module 291 is a device that can take both still and moving images, and according to an embodiment, may include one or more image sensors, e.g., a front sensor or a rear sensor (not shown), a lens (not shown), an Image Signal Processor (ISP) (not shown), or a flash, e.g., an LED or xenon lamp (not shown).

The power management module 295 may manage power of the electronic device 200. Although not shown, the power management module 295, for example, may include a Power Management IC (PMIC), a charger IC, or a battery or fuel gauge.

The PMIC, for example, may be mounted in an IC or an SoC semiconductor. Charging methods may be classified into wired charging and wireless charging. The charger IC may charge a battery, and may prevent an overvoltage or excess current from being induced or flowing from a charger. According to an embodiment, the charger IC may include a charger IC for at least one of the wired charging and the wireless charging. Examples of the wireless charging include magnetic resonance charging, magnetic induction charging, and electromagnetic charging, and an additional circuit such as a coil loop, a resonance circuit, and a rectifier may be added for the wireless charging.

The battery gauge, for example, may measure the residual capacity, charge in voltage, current, or temperature of the battery 296. The battery 296 may store or generate electricity, and may supply power to the electronic device 200 by using the stored or generated electricity. The battery 296, for example, may include a rechargeable battery or a solar battery.

The indicator 297 may display a specific status of the electronic device 200 or a part thereof, e.g., the AP 210, for example, a boot-up status, a message status, or a charging status. The motor 298 may convert an electrical signal into a mechanical vibration. Although not shown, the electronic device 200 may include a processing unit, e.g., a GPU, for supporting a mobile TV. The processing unit for supporting a mobile TV may process media data pursuant to a certain standard, for example, Digital Multimedia Broadcasting (DMB), Digital Video Broadcasting (DVB), or media flow.

Each of the above described elements of the electronic device according to various embodiments of the present disclosure may be formed by one or more components, and the names of the corresponding elements may vary according to the type of the electronic device. The electronic device according to various embodiments the present disclosure may include at least one of the above described elements, and may exclude some of the elements or further include other additional elements. Further, some of the elements of the electronic device according to various embodiments the present disclosure may be coupled to form a single entity while performing the same functions as those of the corresponding elements before the coupling.

The term "module" as used in the present disclosure, for example, may mean a unit including one of hardware, software, and firmware or any combination of two or more of them. The "module", for example, may be interchangeable with the term "unit", "logic", "logical block", "component", or "circuit". The "module" may be the smallest unit of an integrated component or a part thereof. The "module" may be the smallest unit that performs one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing certain operations, which are now known or will be developed in the future.

Figure 3:
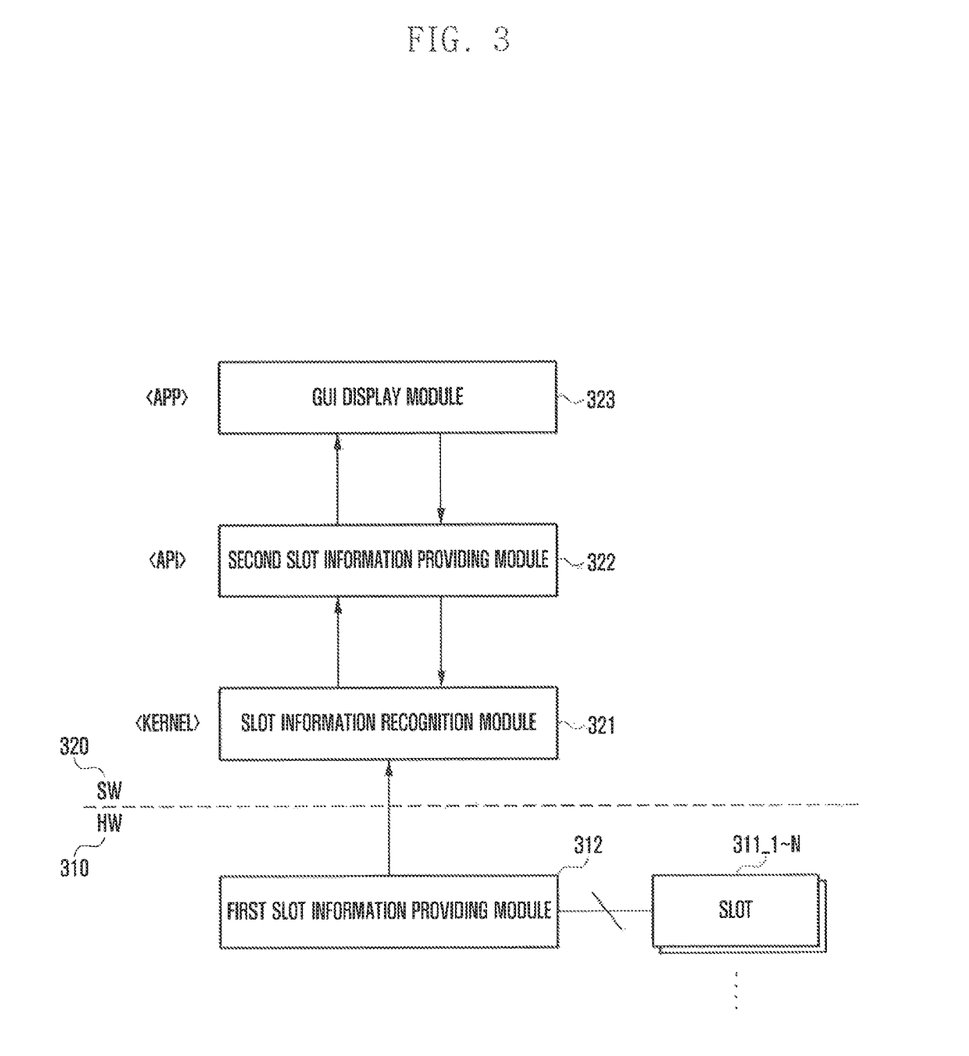
FIG. 3 is a block diagram illustrating an application control module of an electronic device according to an embodiment of the present disclosure.

FIG. 3 illustrates an application control module of an electronic device according to an embodiment of the present disclosure.

An electronic device 310, for example, may be the electronic device 200 shown in FIG. 2. An application control module 320, for example, may be the application control module 170 shown in FIG. 1.

Referring to FIG. 3, the electronic device 310 may include a plurality of slots 311_1 to 311_N and a first slot information providing module 312 in order to achieve connection to a connection component, e.g., the plurality of SIM cards 215_1 to 215_N. The plurality of slots 311_1 to 311_N, for example, may be the plurality of slots 224_1 to 224_N shown in FIG. 2. The first slot information providing module 312, for example, may include a plurality of input terminals, e.g., General Purpose Input/Output (GPIO) terminals, formed in or connected to the CP of the cellular module 221 shown in FIG. 2. These input terminals may be connected to the plurality of slots 311_1 to 311_N respectively.

The application control module 320 may include a slot information recognition module 321, a second slot information providing module 322, and a Graphic User Interface (GUI) display module 323. The slot information recognition module 321 may check the first slot information providing module 312, i.e., the input terminals, during booting, e.g., cold booting or warm booting, of the electronic device 310 to recognize slot information, e.g., the number of slots, whether an SIM card is inserted into a corresponding slot, and the unique information, e.g., phone number, of an inserted SIM card. The slot information recognition module 321 may store slot information in a memory, e.g., RAM. For example, the slot information recognition module 321 may store count data corresponding to the recognized number of slots in a memory, e.g., RAM. Alternatively, the slot information recognition module 321 may provide slot information, e.g., count data, to the second slot information providing module 322 in response to a request from the second slot information providing module 322.

The second slot information providing module 322 may access a specific storage, e.g., the memory in which slot information is stored, and identify slot information, e.g., count data, in response to a request from an application, e.g., the GUI display module 323. The second slot information providing module 322 may transfer identified slot information to the GUI display module 323. Alternatively, the second slot information providing module 322 may request the slot information recognition module 321 for slot information.

The GUI display module 323 may identify slot information received from the second slot information providing module 322. The GUI display module 323 may display application information, e.g., call information, message information, or environment-configuration information, corresponding to identified slot information. For example, the GUI display module 323 may display different application information according to the identified number of SIM card slots. Information displayed through the GUI display module 323 may vary according to identified number of card slots.

The slot information recognition module 321 and the second slot information providing module 322 may be implemented by a general purpose hardware device that runs software for performing operations according to the embodiment of FIG. 3 of the present disclosure. For example, even when a first electronic device has one SIM card slot, a second electronic device has two SIM card slots, and a third electronic device has three SIM card slots, the same slot information recognition module 321 and the same second slot information providing module 322 may be provided in these electronic devices. This is because data representing the number of SIM card slots is stored in the RAM by the slot information recognition module 321 whenever the electronic device is booted up or in a runtime state, and the stored data is provided to the GUI display module 323 by the second slot information providing module 322.

The GUI display module 323 may also be implemented by a general purpose hardware device that runs software for performing operations according to the embodiment of FIG. 3. For example, when the GUI display module 323 is provided in the first electronic device, it may display application information corresponding to slot information indicating that the number of SIM card slots is "one". When the GUI display module 323 is provided in the second electronic device, it may display application information corresponding to slot information indicating that the number of SIM card slots is "two". When the GUI display module 323 is provided in the third electronic device, it may display application information corresponding to slot information indicating that the number of SIM card slots is "three".

According to various embodiments of the present disclosure, an electronic device, e.g., the electronic device 310, may further include a slot for connection to an external memory, e.g., a micro SD card. Accordingly, the first slot information providing module 312 may further include an input terminal, e.g., a GPIO terminal, connected to the SD card slot. The slot information recognition module 321 may check the first slot information providing module 312 during booting of the electronic device to recognize information on the SD card slot, e.g., the number of slots and whether an SD card is inserted into the SD card slot, and store the recognized information in the RAM. Alternatively, the slot information recognition module 321 may provide information on the SD card slot to the second slot information providing module 322. The GUI display module 323 may receive information on the SD card slot from the second slot information providing module 322 and display application information, e.g., information on a home application, including a GUI corresponding to the information on the SD card slot, for example, an icon representing an SD card.

According to various embodiments, an electronic device, e.g., the electronic device 310, may further include a connection terminal for connecting an external NFC module to an input terminal, e.g., a GPIO terminal, of a processor, e.g., an AP. Accordingly, the corresponding input terminal, for example, may be an additional element of the first slot information providing module 312. In addition, the external NFC module may be provided in a cover for protecting the exterior of the electronic device, e.g., a smartphone. An application control module, e.g., the application control module 320, may recognize an external NFC module and transfer NFC information to the GUI display module 323. The GUI display module 323 may display a GUI corresponding to the NFC information, for example, an indicator representing an external NFC module.

According to some various embodiments, an application control module, e.g., the application control module 320, may include the slot information recognition module 321 that checks the first slot information providing module 312 during runtime, e.g., during execution of the GUI display module 323, to recognize slot information. The slot information recognition module 321 may transfer recognized slot information to the GUI display module 323 through the second slot information providing module 322.

Figure 4:
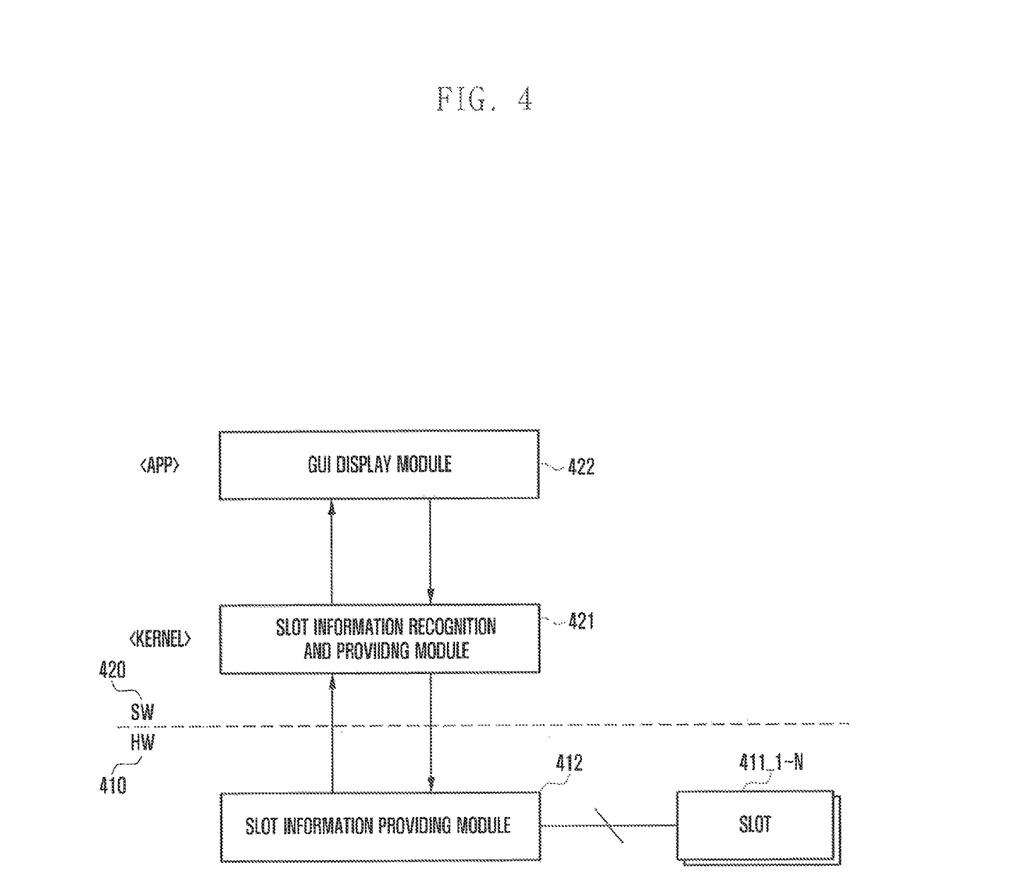
FIG. 4 is a block diagram illustrating an application control module of an electronic device according to another embodiment of the present disclosure.

FIG. 4 illustrates an application control module of an electronic device according to an embodiment of the present disclosure.

Referring to FIG. 4, an electronic device 410 may include a plurality of slots 411_1 to 411_N and a slot information providing module 412 in order to achieve connection to a connection component, e.g., one of the plurality of SIM cards 224_1 to 224_N. The plurality of slots 411_1 to 411_N, for example, may be the plurality of slots 311_1 to 311_N shown in FIG. 3. The slot information providing module 412, for example, may be the first slot information providing module 312 shown in FIG. 3. An application control module 420 may include a slot information recognition and providing module 421 and a GUI display module 422. The slot information recognition and providing module 421, for example, may correspond to the slot information recognition module 321 and the second slot information providing module 322 shown in FIG. 3.

According to various embodiments, an electronic device may include at least one connection component, a memory, a display, an application control module that recognizes the number of the at least one connection component, stores count data corresponding to the recognized number of the at least one connection component in the memory, acquires the count data from the memory, and displays application information corresponding to the acquired count data through the display, and at least one processor that executes the application control module.

According to various embodiments, the at least one connection component may include at least one SIM card slot. The at least one processor, e.g., a CP or an AP, may execute the application control module while the electronic device is booted up or an application is executed. The application control module may identify a value input into at least one input terminal, e.g., a GPIO terminal, formed in the at least one processor. The application control module may recognize the number of the at least one connection component while the electronic device is booted up or an application of the electronic device is executed. The application control module may display one or more user interface objects associated with an application requested to be executed, the number of which corresponds to the count data, as at least a part of the application information. The application control module may display identification information for the at least one connection component as at least a part of the application information.

Figure 5:
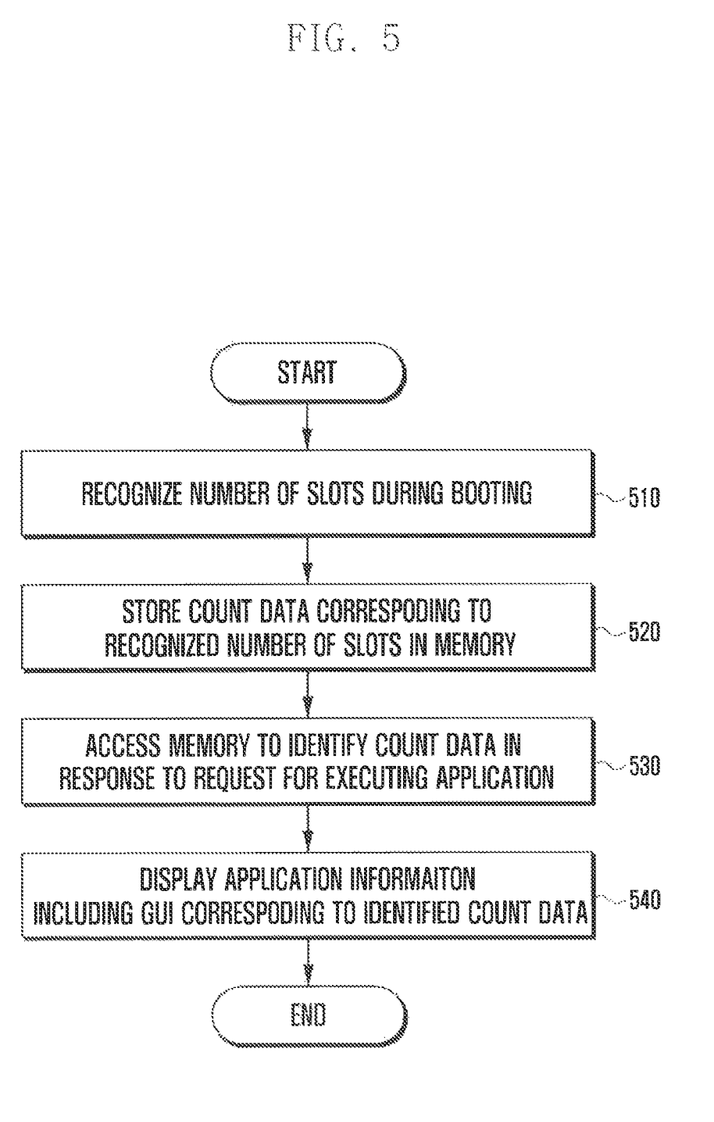
FIG. 5 is a flowchart illustrating a method of operating an electronic device according to an embodiment of the present disclosure.

FIG. 5 illustrates a method of operating an electronic device according to an embodiment of the present disclosure.

Referring to FIG. 5, in operation 510, a processor 210 of the electronic device 200 may recognize and/or determine the number of slots provided in the electronic device during booting. For example, the processor 210 may recognize the number of slots by identifying a value input into at least one input terminal. The input value may be a value, e.g., a voltage level, indicating the number of slots.

In operation 520, the processor 210 may store count data corresponding to the recognized number of slots in memory, such as a RAM.

The processor 210 may receive a request for executing an application, e.g., a dialer application or an SMS/MMS application, from an input module 250. In response to this, the processor 210 may execute the corresponding application, for example, load the corresponding application from a secondary memory, e.g., flash memory or hard disk, into a main memory, e.g., RAM, SRAM, or SDRAM, and process the loaded application. Some applications, e.g., a home application, may be automatically, i.e., without a user's request for execution, executed when booting is completed. In operation 530, the processor 210 may access a memory to identify the count data in response to a request for executing the application during runtime, i.e., while an application is executed.

In operation 540, the processor 210 may control a display 260 to display application information including a GUI corresponding to the identified count data.

Figure 6:
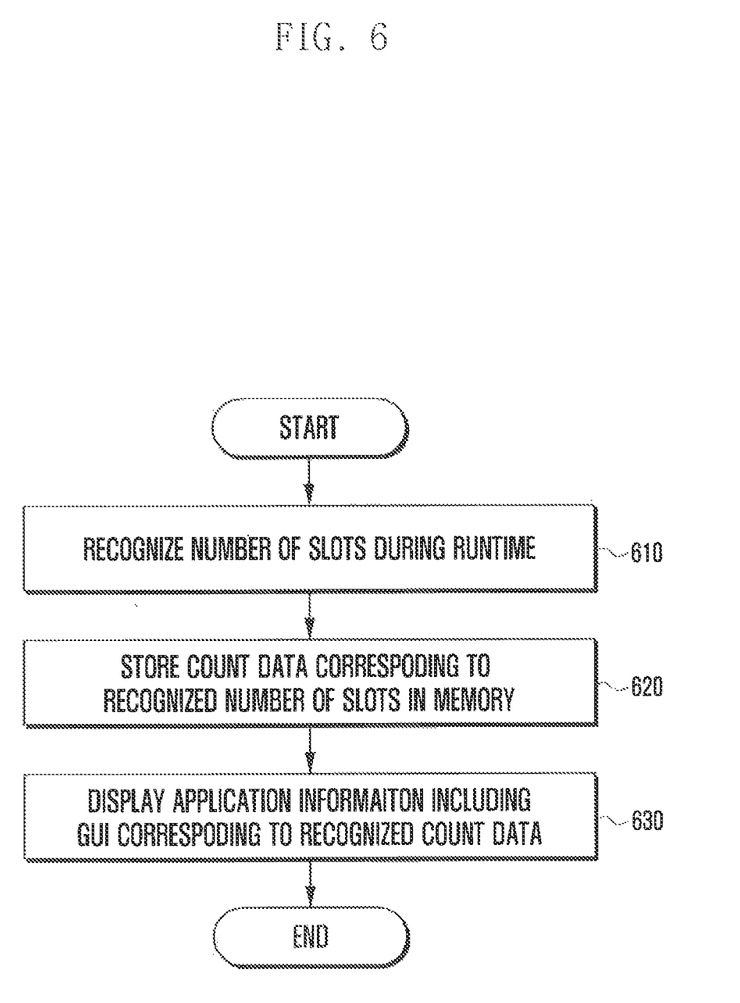
FIG. 6 is a flowchart illustrating a method of operating an electronic device according to another embodiment of the present disclosure.

FIG. 6 illustrates a method of operating an electronic device according to another embodiment of the present disclosure.

Referring to FIG. 6, the processor 210 of the electronic device 200 may receive a request for executing an application from input module 250. In response to this, the processor 210 may execute the corresponding application. Also, in operation 610, the processor 210 may recognize, and/or determine, the number of slots provided in the electronic device 200 during runtime, e.g., while a home application, a dialer application, an SMS/MMS application or the like is executed. In operation 620, the processor 210 may store count data corresponding to the recognized number of slots in a memory, e.g., a RAM included in the memory 232. In operation 630, the processor 210 may control a display 260 to display application information including a GUI corresponding to recognized count data.

According to various embodiments, a method of operating an electronic device may include recognizing, and/or determining, and/or detecting the number of connection components provided in the electronic device, storing count data corresponding to the recognized number of the connection components in a memory of the electronic device, acquiring the count data from the memory, and displaying application information corresponding to the acquired count data through a display functionally connected to the electronic device. The application information may include one or more user interface objects associated with an application requested to be executed, the number of which corresponds to the count data, or one or more pieces of identification information for the connection components, the number of which corresponds to the count data.

According to various embodiments, the recognizing of the number of the connection components may include recognizing the number of slots which are formed in the electronic device and through which the connection components can be attached to or detached from the electronic device, and recognizing the number of the connection components, based on the number of the slots. The recognizing of the number of the slots may include identifying a value input into at least one input terminal formed in a processor of the electronic device. The identifying of the value input into the at least one input terminal may include identifying the input value through at least one GPIO terminal formed in the processor.

According to various embodiments, the recognizing of the number of the connection components may include recognizing the number of SIM card slots provided in the electronic device as the number of the connection components.

According to various embodiments, the recognizing of the number of the connection components may include recognizing the number of the connection components during booting of the electronic device or during execution of an application of the electronic device.

According to various embodiments, the recognizing of the number of the connection components may be performed during booting of the electronic device, and the acquiring of the count data may be performed during execution of an application of the electronic device.

Figure 7:
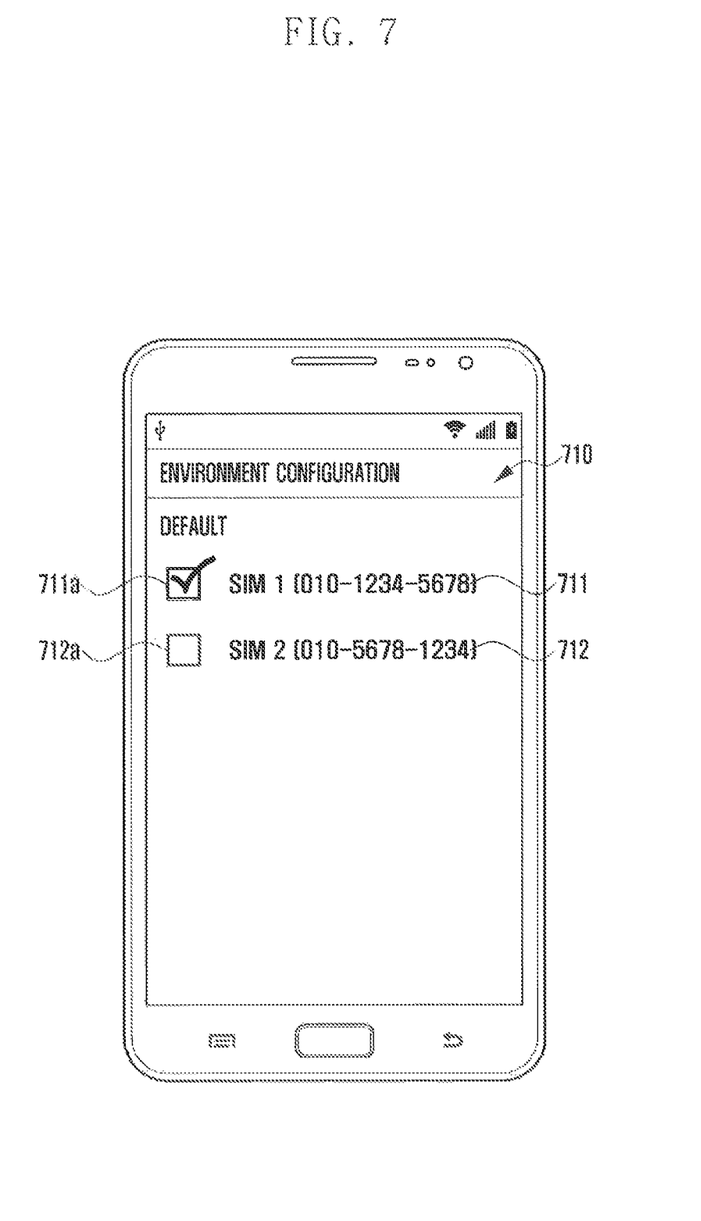
FIG. 7 illustrates a screen displaying information of an environment-configuration application according to an embodiment of the present disclosure.

FIG. 7 illustrates a screen displaying information of an environment-configuration application according to an embodiment of the present disclosure.

Referring to FIG. 7, upon recognizing slot information, the processor 210 of the electronic device 200 may control a display 260 to display information 710 of an environment-configuration application, as shown in FIG. 7. The information 710, for example, may include identification information 711, e.g., phone number "010-1234-5678", for a first SIM card 225_1 inserted into a first slot 224_1 and identification information 712, e.g., phone number "010-1234-5678", for a second SIM card 225_2 inserted into a second slot 224_2. The information 710 may further include checkboxes 711a, 712a corresponding to the identification information 711 and the identification information 712 respectively. For example, if the checkbox 711a corresponding to the identification information 711 is checked, then the processor 210 may set the first SIM card 225_1 as the default SIM card. The processor 210 may perform communication, e.g., calling and message sending, by using the set default SIM card.

Figure 8:
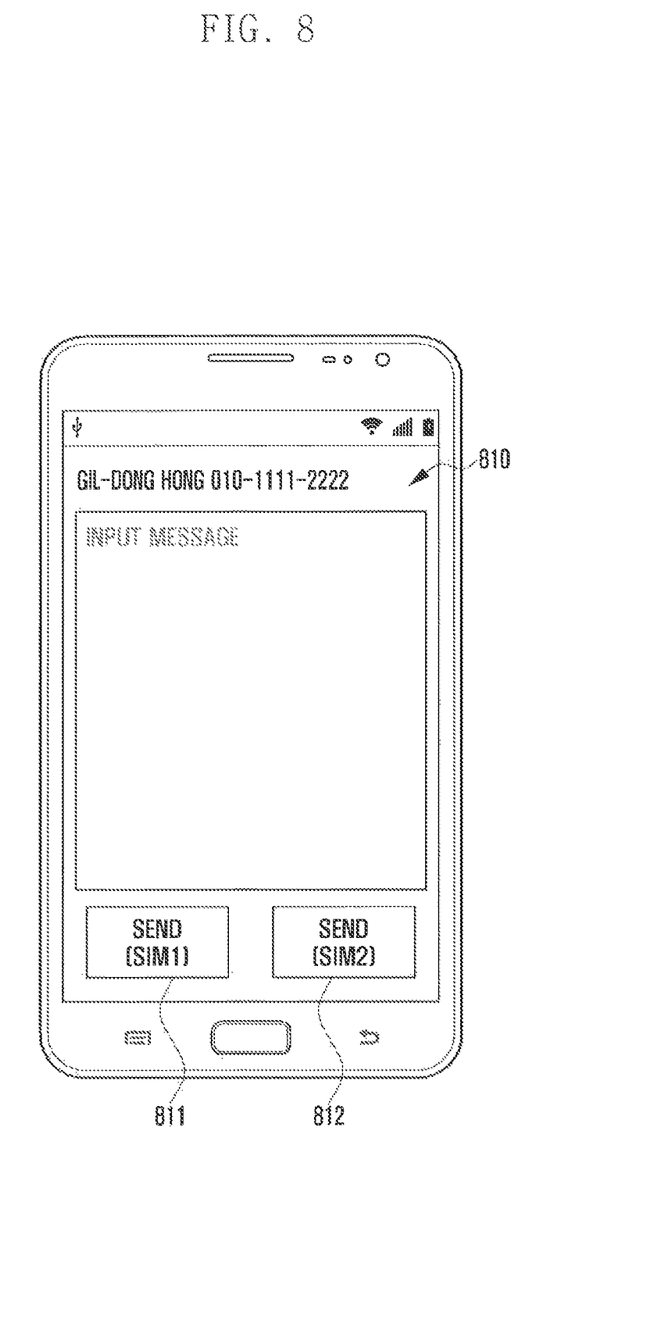
FIG. 8 illustrates a screen displaying information of a messaging application according to an embodiment of the present disclosure.

FIG. 8 illustrates a screen displaying information of a messaging application according to an embodiment of the present disclosure.

On recognizing slot information, the processor 210 of the electronic device 200 may control a display 260 to display information 810 of a messaging application, as shown in FIG. 8. The information 810, for example, may include a first "Send Message" button 811 corresponding to the first SIM card 225_1 inserted into a first slot 224_1 and a second "Send Message" button 812 corresponding to a second SIM card 225_2 inserted into a second slot 224_2. For example, if the first "Send Message" button 811 is selected by a user, then the processor 210 may control a communication module 230 to send a message by using the first SIM card 225_1.

Figure 9:
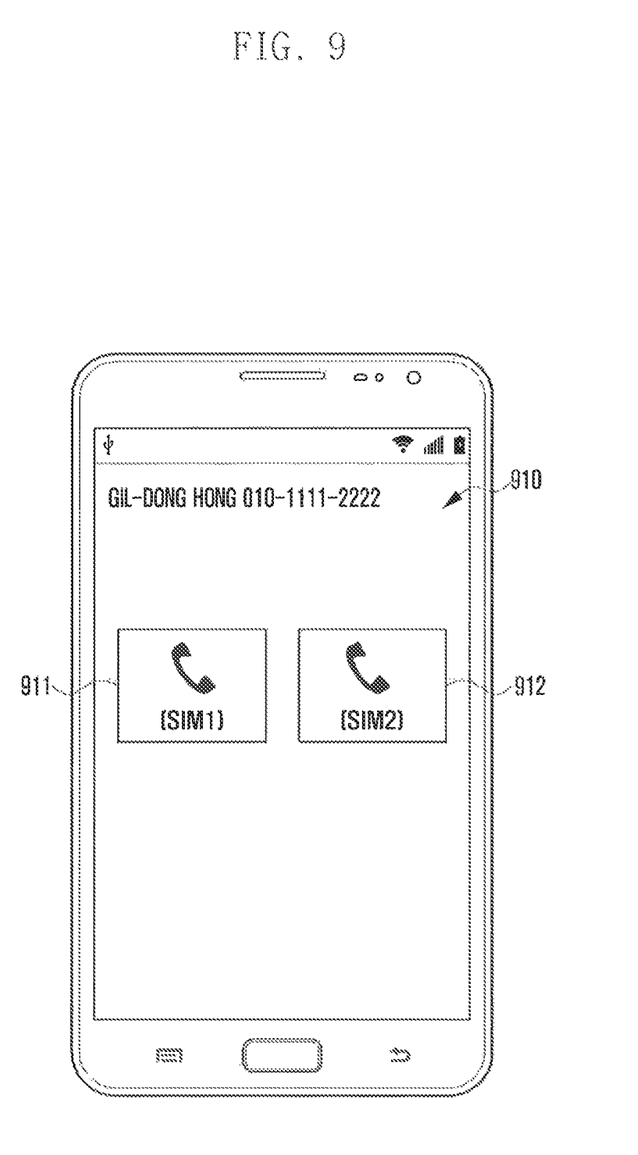
FIG. 9 illustrates a screen displaying information of a calling application according to an embodiment of the present disclosure.

FIG. 9 illustrates a screen displaying information of a calling application according to an embodiment of the present disclosure.

On recognizing slot information, the processor 210 of the electronic device 200 may control a display 260 to display information 910 of a calling application, as shown in FIG. 9. The information 910, for example, may include a first "Send Call" button 911 corresponding to the first SIM card 225_1 inserted into the first slot 224_1 and a second "Send Call" button 912 corresponding to the second SIM card 225_2 inserted into the second slot 224_2. For example, if the first "Send Call" button 911 is selected by a user, then the processor 210 may control a communication module 220 to send a call request by using the first SIM card 225_1.

At least some of the devices, e.g., modules or functions thereof, or methods, e.g., operations, according to various embodiments of the present disclosure, for example, may be implemented by an instruction stored in a computer-readable storage medium in the form of a programming module. The instruction, when executed by at least one processor, e.g., the processor 210, enables the at least one processor to perform a function corresponding to the instruction. The computer-readable storage medium, for example, may be the memory 220. At least a part of the programming module, for example, may be implemented, e.g., executed, by the processor 210. At least a part of the programming module, for example, may include a module, a program, a routine, a set of instructions, or a process for performing at least one function.

The computer-readable recording medium may include magnetic media such as a hard disc, a floppy disc, and a magnetic tape, optical media such as a Compact Disc Read Only Memory (CD-ROM) and a DVD, magneto-optical media such as a floptical disk, and hardware devices specifically configured to store and execute a program instruction, e.g., a programming module, such as a Read Only Memory (ROM), a RAM, and a flash memory. Further, the program instruction may include high class language codes that can be executed in a computer by using an interpreter, as well as machine language codes that are made by a compiler. Any of the hardware devices as described above may be configured to work as one or more software modules in order to perform the operations according to various embodiments of the present disclosure, and vice versa.

Any of the modules or programming modules according to the present disclosure may include at least one of the above described elements, exclude some of the elements, or further include other additional elements. The operations performed by the modules, programming modules, or other elements according to the present disclosure may be executed in a sequential, parallel, repetitive, or heuristic manner. Further, some of the operations may be executed in a different order, some of the operations may be omitted, or other operations may be added.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method of operating an electronic device, the method comprising:

recognizing a number of connection components provided in the electronic device, each connection component being a subscriber identification module (SIM) card slot;

storing count data corresponding to the recognized number of the connection components in a memory of the electronic device;

acquiring the count data from the memory; and displaying a communication interface of an application being executed for communicating with an external device and a connection interface of the application for providing application information related to the acquired count data through a display connected to the electronic device, wherein the communication interface and the connection interface are displayed simultaneously, wherein the application information includes an icon corresponding to each of the recognized number of the connection components for controlling communication through the communication interface of the same said executed application, wherein the recognizing of the number of the slots comprises identifying a value input through at least one general purpose input/output (GPIO) terminal formed in a processor, wherein the application information includes at least one piece of identification information for the connection components, and wherein a number of the at least one piece of identification information corresponds to the acquired count data.

2. The method of claim 1, wherein the recognizing of the number of the connection components comprises:
recognizing the number of the connection components during at least one of booting of the electronic device and execution of the application of the electronic device.

3. The method of claim 1, wherein the application includes at least one of a calling application, a messaging application, and an environment-configuration application.

4. The method of claim 1, wherein the recognizing of the number of the connection components is performed during booting of the electronic device, and the acquiring of the count data is performed during execution of the application of the electronic device.

5. The method of claim 1, wherein the application information includes at least one of call information, message information, and environment configuration information.

6. An electronic device comprising:
at least one connection component;
a memory configured to store count data;
a display configured to display application information;
at least one processor configured to execute an application control module to:
recognize a number of the at least one connection component, each connection component being a subscriber identification module (SIM) card slot,
store the count data corresponding to the recognized number of the at least one connection component in the memory,
acquire the count data from the memory, and
display a communication interface of an application being executed for communicating with an external device and a connection interface of the application for providing application information related to the acquired count data through the display,
wherein the communication interface and the connection interface are displayed simultaneously,
wherein the application information includes an icon corresponding to each of the at least one recognized connection component for controlling communication through the communication interface of the same said executed application,
wherein the at least one processor is further configured to execute the application control module to identify, in order to recognize the number of the at least one connection component, a value input through at least one general purpose input/output (GPIO) terminal formed in the at least one processor,
wherein the at least one processor is further configured to execute the application control module to display at least one piece of identification information for the connection components, and
wherein a number of the at least one piece of identification information corresponds to the acquired count data.

7. The electronic device of claim 6, wherein the at least one processor is further configured to execute the application control module during booting or during execution of the application.

8. The electronic device of claim 7, wherein the at least one processor includes at least one of a communication processor and an application processor.

9. The electronic device of claim 6, wherein the at least one processor is further configured execute the application control module to recognize the number of the connection components during at least one of booting of the electronic device and execution of the application of the electronic device.

10. The electronic device of claim 6, wherein the application includes at least one of a calling application, a messaging application, and an environment-configuration application.

* * * * *